(12) United States Patent
Deighton

(10) Patent No.: US 10,857,961 B2
(45) Date of Patent: Dec. 8, 2020

(54) MOUNTING SYSTEM FOR TRUCK UNDERRIDE PROTECTION

(71) Applicant: Hydro Extrusion USA, LLC, Rosemont, IL (US)

(72) Inventor: Malcolm Deighton, Rosemont, IL (US)

(73) Assignee: HYDRO EXTRUSION USA, LLC, Rosemont, IL (US)

( * ) Notice: Subject to any disclaimer, the term of this patent is extended or adjusted under 35 U.S.C. 154(b) by 175 days.

(21) Appl. No.: 15/987,723

(22) Filed: May 23, 2018

(65) Prior Publication Data

US 2019/0359156 A1    Nov. 28, 2019

(51) Int. Cl.
| | |
|---|---|
| *B60R 19/24* | (2006.01) |
| *B60R 19/56* | (2006.01) |
| *F16B 5/06* | (2006.01) |
| *F16B 2/06* | (2006.01) |

(52) U.S. Cl.
CPC ............ *B60R 19/24* (2013.01); *B60R 19/565* (2013.01); *F16B 2/065* (2013.01); *F16B 5/0685* (2013.01)

(58) Field of Classification Search
CPC ..... B60R 19/24; B60R 19/565; F16B 5/0685; F16B 2/065
USPC ........................................................ 293/155
See application file for complete search history.

(56) References Cited

U.S. PATENT DOCUMENTS

| | | |
|---|---|---|
| 5,280,990 A | 1/1994 | Rinard |
| 5,609,384 A | 3/1997 | Loewen |
| 9,272,741 B2 | 3/2016 | Gerst |
| 9,463,759 B1 | 10/2016 | Kiefer |
| 9,975,583 B2 | 5/2018 | Senatro |
| 2002/0149230 A1 | 10/2002 | Schroeder |
| 2003/0057736 A1 | 3/2003 | Long et al. |
| 2005/0104390 A1 | 5/2005 | Norelius |

(Continued)

FOREIGN PATENT DOCUMENTS

| | | |
|---|---|---|
| CA | 2848174 A1 | 10/2014 |
| CH | 526066 | 7/1972 |

(Continued)

OTHER PUBLICATIONS

Extended European Search Report for Application No. 19176279.8, dated Jul. 4, 2019, 9 pages.

*Primary Examiner* — Joseph D. Pape
*Assistant Examiner* — Dana D Ivey
(74) *Attorney, Agent, or Firm* — Loeb & Loeb LLP

(57) ABSTRACT

A mounting system for a guard panel on a vehicle with cross members. The mounting system comprises a mounting rail having first and second ends. The mounting rail includes a clamping portion including a mounting platform, a mounting slot in the mounting platform along a length of the mounting rail between the first and second ends, and a panel portion. The mounting system includes a panel bracket coupled to the panel portion. The panel bracket receives at least one guard panel. The mounting system includes a clamping body coupled to the mounting platform. The clamping body is movable along the mounting slot of the mounting platform. The clamping body engages a first surface of a cross member and the mounting platform engages a second surface of the cross member so as to clamp the cross member between the clamping body and the mounting platform.

20 Claims, 12 Drawing Sheets

(56) References Cited

U.S. PATENT DOCUMENTS

| | | | |
|---|---|---|---|
| 2006/0091718 A1* | 5/2006 | Thomas | B60P 1/16 298/17.7 |
| 2007/0085355 A1 | 4/2007 | Eriksson et al. | |
| 2007/0120397 A1* | 5/2007 | Layfield | B62D 35/001 296/180.4 |
| 2008/0116702 A1 | 5/2008 | Enz et al. | |
| 2009/0212595 A1 | 8/2009 | Heppel et al. | |
| 2009/0267365 A1 | 10/2009 | Puppini et al. | |
| 2010/0264690 A1 | 10/2010 | Brown et al. | |
| 2012/0032475 A1 | 2/2012 | Grandominico et al. | |
| 2012/0091754 A1 | 4/2012 | Lee et al. | |
| 2012/0153668 A1 | 6/2012 | van Raemdonck | |
| 2012/0235441 A1 | 9/2012 | Dayton | |
| 2013/0181477 A1 | 7/2013 | Reiman et al. | |
| 2013/0187371 A1 | 7/2013 | Mauduit et al. | |
| 2013/0285411 A1 | 10/2013 | Layfield et al. | |
| 2014/0028055 A1 | 1/2014 | Song | |
| 2014/0123719 A1 | 5/2014 | Lukasak | |
| 2014/0159419 A1 | 6/2014 | Baker et al. | |
| 2014/0265438 A1 | 9/2014 | Kronemeyer | |
| 2014/0300134 A1 | 10/2014 | Gerst | |
| 2015/0069784 A1 | 3/2015 | Song | |
| 2015/0259014 A1 | 9/2015 | Baker et al. | |
| 2016/0059910 A1 | 3/2016 | Durand et al. | |
| 2016/0121940 A1 | 5/2016 | Courtney et al. | |
| 2017/0008576 A1 | 1/2017 | Petersson | |
| 2018/0237081 A1 | 8/2018 | Senatro | |
| 2019/0308675 A1 | 10/2019 | Miyakawa | |

FOREIGN PATENT DOCUMENTS

| | | |
|---|---|---|
| CN | 202944279 U | 5/2013 |
| EP | 0 857 620 A1 | 12/1998 |
| EP | 2860433 | 4/2015 |
| JP | 10-16823 A | 1/1998 |
| JP | 2001-010549 A | 1/2001 |
| JP | 2002-019574 A | 1/2002 |
| JP | 2013-91384 A | 5/2013 |
| JP | 2013-119302 A | 6/2013 |
| JP | 2015-196468 A | 11/2015 |
| MX | 342343 B | 10/2014 |
| WO | 2017-009831 A1 | 1/2017 |
| WO | 2017-059332 A1 | 4/2017 |

* cited by examiner

US 10,857,961 B2

MOUNTING SYSTEM FOR TRUCK UNDERRIDE PROTECTION

TECHNICAL FIELD

The present disclosure relates generally to the field of heavy-duty vehicles, and more specifically to a system for truck underride protection.

BACKGROUND

Trucks and other large vehicles tend to be elevated such that a relatively large amount of space exists between the ground and the vehicle body or the structure of a trailer or other object connected to or being towed by the vehicle. This large space can present a danger to pedestrians, cyclists, or other vehicles that may be forced under the truck's tires in the event of a collision. Systems are needed to reduce this danger associated with trucks and other large vehicles.

SUMMARY

In an embodiment, the disclosure describes mounting system for a guard panel on a vehicle with one or more cross members. The mounting system may comprising a mounting rail having a first end and a second end. The mounting rail may include a clamping portion including a mounting platform, at least one mounting slot being formed in the mounting platform at least partially along a length of the mounting rail between the first end and the second end, and a panel portion opposite the clamping portion. A panel bracket may be coupled to the panel portion of the mounting rail. The panel bracket may be configured to receive at least one guard panel. The mounting system may include least one clamping body removably coupled to the mounting platform of the mounting rail. The at least one clamping body may be movable along the at least one mounting slot of the mounting platform. At least a portion of each of the at least one clamping body may be configured to engage a first surface of a cross member and at least a portion of the mounting platform may be configured to engage a second surface of the cross member opposite the first surface, so as to clamp at least a portion of the cross member between the at least one clamping body and the mounting platform.

In another embodiment, the disclosure describes a mounting rail for a mounting system to mount a guard panel to a vehicle with cross members. The mounting rail may comprise a clamping portion including a mounting platform, where at least one mounting slot may be formed in the mounting platform at least partially along a length of the mounting rail between a first end and a second end. Each of the at least one mounting slot may include a slot opening portion formed into the mounting platform and configured to slidably receive a body portion of a clamping fastener. Each of the at least one mounting slot may include a slot groove portion formed deeper into the mounting platform than the slot opening portion. The slot groove portion may be configured to slidably receive a head portion of the clamping fastener. The mounting rail may include a panel portion opposite the clamping portion. The panel portion may be coupled to a guard panel. The clamping fastener may be configured to selectively secure a clamping body against the mounting platform so as to couple the clamping portion to a cross member of the vehicle.

In another embodiment, the disclosure describes a mounting system for a guard panel on a vehicle with one or more cross members. The mounting system may comprise a mounting rail having a first end and a second end. The mounting rail may include a clamping portion including a mounting platform, at least one mounting slot being formed in the mounting platform at least partially along a length of the mounting rail between the first end and the second end, and a panel portion opposite the clamping portion. The mounting system may include a panel bracket coupled to the panel portion of the mounting rail. The panel bracket may be configured to receive at least one guard panel. The mounting system may include at least one clamping body removably coupled to the mounting platform of the mounting rail. The at least one clamping body may be movable along the at least one mounting slot of the mounting platform. The mounting system may include at least one clamping fastener coupling each of the at least one clamping body to the mounting platform. At least a portion of the at least one clamping fastener may be slidably disposed within the at least one mounting slot so as to permit the at least one clamping fastener to slide along a length of the mounting slot. At least a portion of each of the at least one clamping body may be configured to engage a first surface of a cross member and at least a portion of the mounting platform may be configured to engage a second surface of the cross member opposite the first surface, so as to clamp at least a portion of the cross member between the at least one clamping body and the mounting platform.

BRIEF DESCRIPTION OF THE DRAWINGS

Non-limiting and non-exhaustive embodiments are described in reference to the following drawings. In the drawings, like reference numerals refer to like parts through all the various figures unless otherwise specified.

For a better understanding of the present disclosure, a reference will be made to the following detailed description, which is to be read in association with the accompanying drawings, wherein.

DETAILED DESCRIPTION

Figure 1:
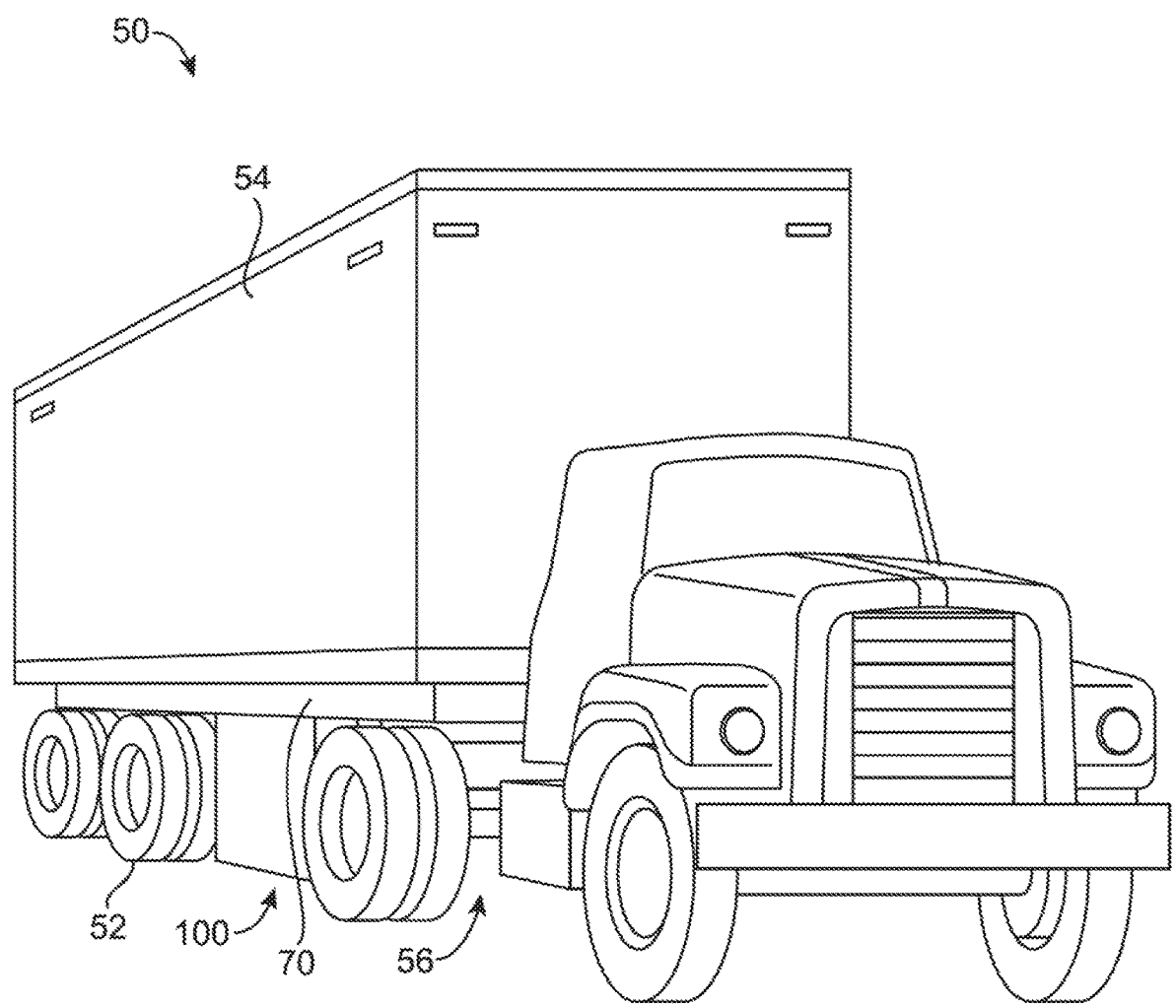
FIG. 1 is a front perspective view of a truck including an embodiment of a mounting system as disclosed herein.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, although it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and includes plural references. The meaning of "in" includes "in" and "on."

The present disclosure relates to a mounting system for truck underride protection. Embodiments of the mounting system described may be coupled to a truck or other large vehicle to help prevent bicycles, pedestrians, or any other vehicles from entering a space beneath a large vehicle. Embodiments of the mounting system may be scalable so as to fit vehicles of varying dimensions with limited or no modification. Some embodiments of the mounting system may allow a guard panel to be readily removable from the large vehicle. Guard panels may be made from a variety of materials or composites, including metals and/or polymers, depending on size of a vehicle and the type of application. In some embodiments, of the disclosed mounting system, guard panels may be coupled to a vehicle with no or very few additional holes formed in the vehicle's structure or other modifications made to the vehicle body. The mounting system, and thus the guard panels, may also be relatively easily replaced or removed in order to access the underside of a vehicle.

Referring to FIG. 1, an embodiment of the disclosed mounting system 100 is shown installed on a large vehicle 50. In this embodiment, the mounting system 100 may help prevent vehicles or pedestrians from being forced beneath the vehicle's 50 tires 52. In such an embodiment, the mounting system 100 may be mounted to the underside 56 of a vehicle trailer 54. It should be understood, however, that the mounting system 100 may be applied to other large vehicles, such as vans or trucks without trailers.

Figure 2:
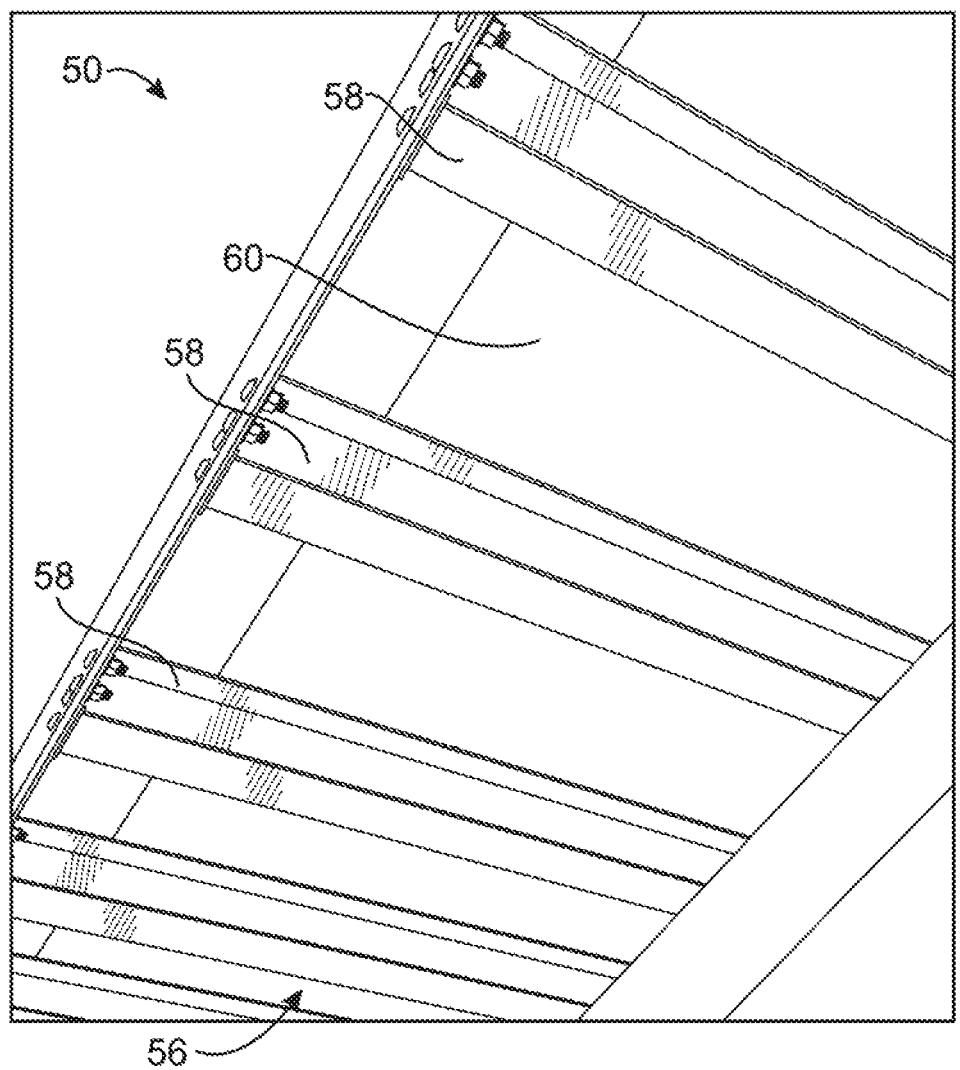
FIG. 2 is a partial bottom perspective view of the truck of FIG. 1.

The underside 56 of many large vehicles may include one or more cross members 58 generally spanning the width of the vehicle 50. FIG. 2 illustrates an exemplary underside 56 of a vehicle 50 that includes a plurality of cross members 58 that may support a floor 60 of the vehicle. The precise dimensions and location of the cross members may vary from vehicle to vehicle depending on the vehicle's size or purpose. For example, some vehicles may have cross members 58 spaced far apart from one another and have larger individual dimensions, while some may be spaced nearer to one another and have smaller individual dimensions. In some embodiments, the mounting system 100 disclosed herein may be scalable so as to be usable with the cross members 58 of various designs.

Figure 3:
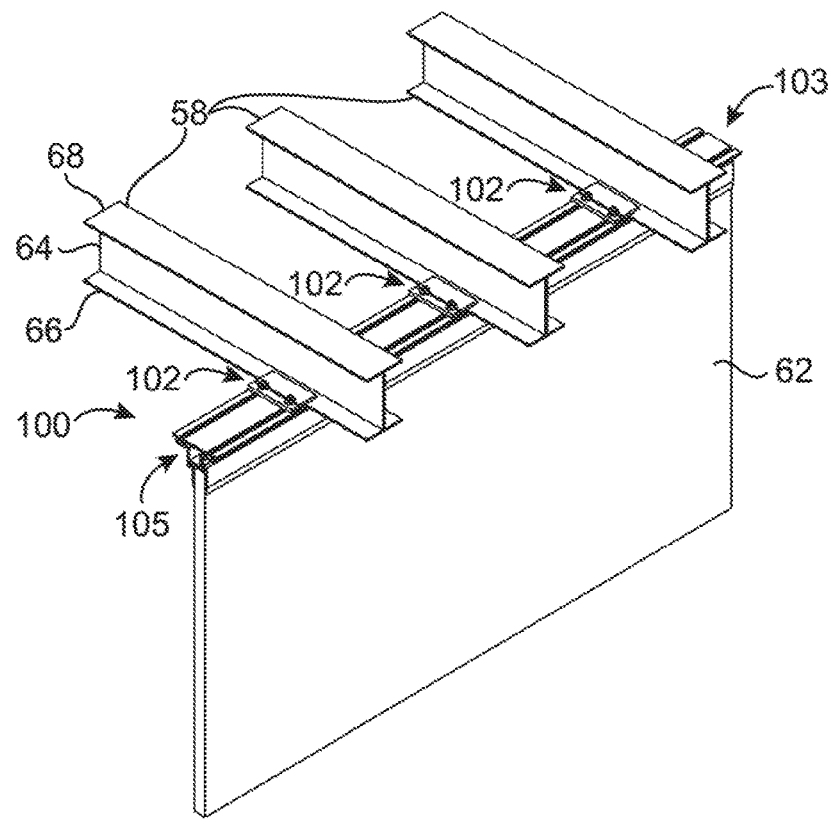
FIG. 3 is a front-right perspective view of an embodiment of a mounting system as described herein connected to cross members of a truck or other vehicle.
Figure 4:
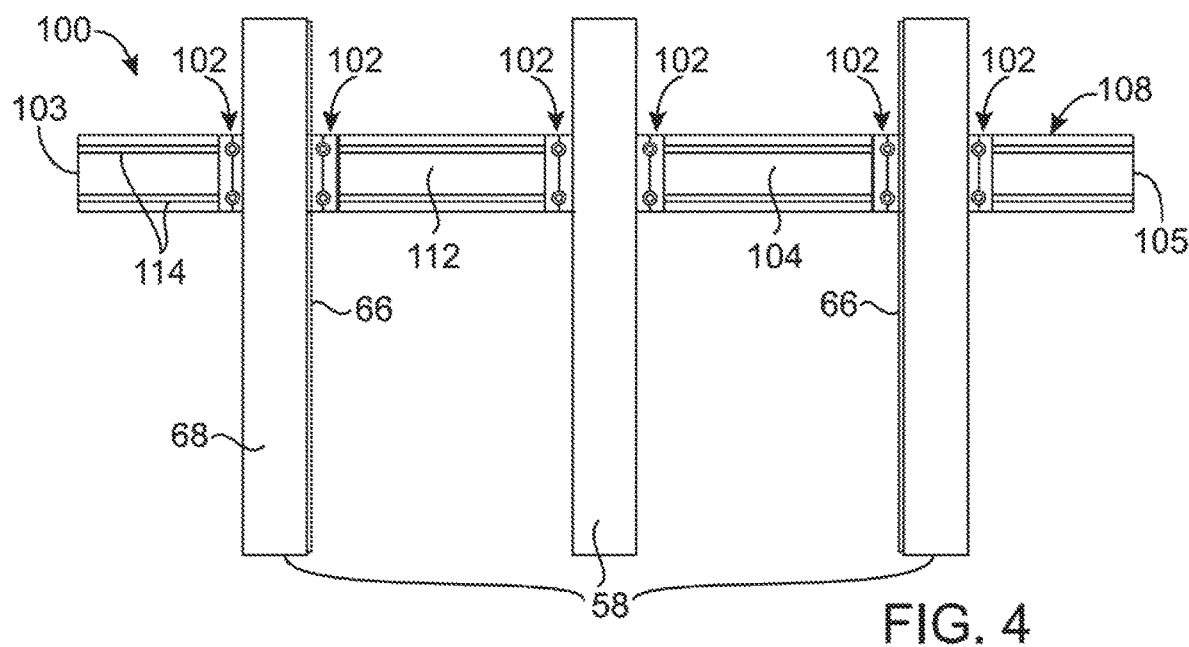
FIG. 4 is a top view of the mounting system of FIG. 3.
Figure 5:
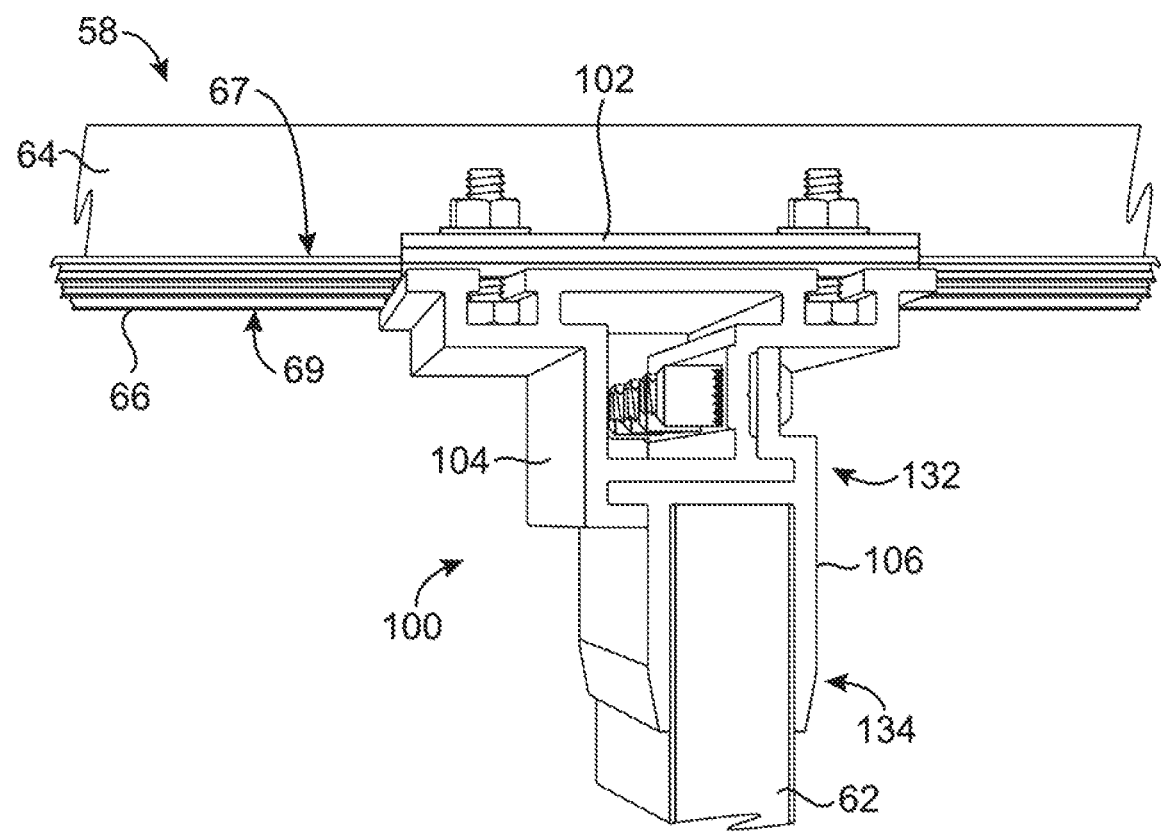
FIG. 5 is a front perspective view of the mounting system of FIG. 3.

FIGS. 3-5 show an embodiment of the mounting system 100 installed on cross members 58 of a vehicle that is not shown in these figures for ease of illustration. As shown in FIG. 3, the cross members 58 may be I-beams each including a web 64 connecting a lower flange 66 and an upper flange 68. It should be understood, however, that embodiments of the mounting system 100 may be configured so as to connect to differently shaped cross members, such as U-beams. The mounting system 100 may be coupled to the cross members 58 and to one or more guard panels 62. The guard panels 62 may be disposed under the vehicle 50 substantially perpendicular to the cross members 58, may be made from a variety of materials, and be any shape suitable for a particular vehicle. For example, the guard panel 62 in FIGS. 3-4 spans three cross members 58; however, in other embodiments, the guard panel 62 may be shorter or longer to accommodate the particular length appropriate for the particular vehicle. Additionally, in some embodiments, multiple guard panels may be mounted to the cross members 58 via the mounting system 100. Additionally, although only the mounting system 100 is only shown on one side of the vehicle 50, it should be understood that the disclosed mounting system may be installed on any side of a vehicle that is suitable for the mounting mechanisms.

Figure 6:
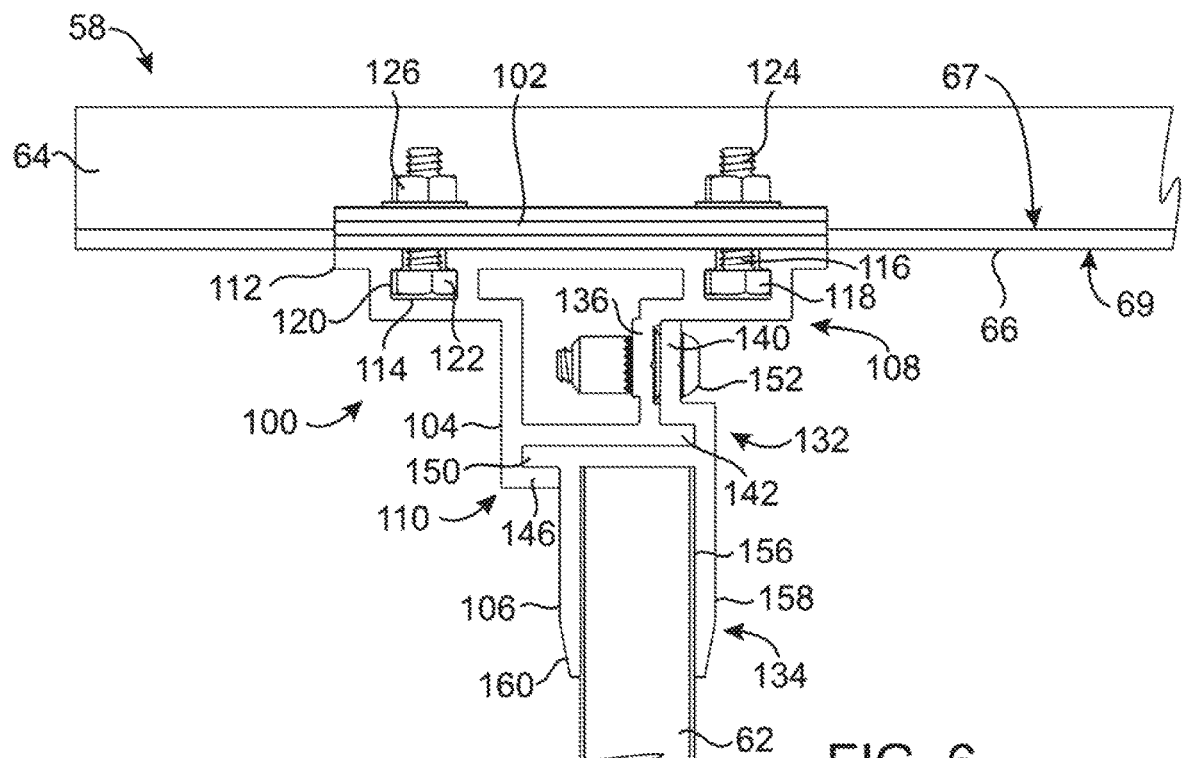
FIG. 6 is a front view of the mounting system of FIG. 3.

Referring to FIGS. 5 and 6, the mounting system 100 may include at least one clamping body 102, a mounting rail 104, and a panel bracket 106. In some embodiments, the mounting rail 104 may be made of an extruded aluminum alloy; however, it is contemplated that any suitable material may be used. The mounting rail 104 may have a clamping portion 108 and a panel portion 110 opposite the clamping portion. Each clamping body 102 may be removably and/or movably coupled to the clamping portion 108, and the panel bracket 106 may be coupled removably or permanently to the panel portion 110.

In some embodiments, the clamping bodies 102 may couple the mounting system 100 to the lower flange 66 without any holes or other modifications to the cross members 58 themselves, or to any other portion of a vehicle, such as the chassis or frame. In some embodiments, a plurality of clamping bodies 102 may be movably distributed across the mounting rail 104 to accommodate variable cross-member spacing. For example, as shown in FIG. 4, two clamping bodies 102 engage with the lower flange 66 of each cross member 58. In some embodiments, however, it may be desirable to use only one clamping body 102 per cross member or, alternatively, use clamping bodies on fewer than all the cross members for a particular vehicle. The clamping bodies 102 may be movable with respect to the mounting rail 104 to match the spacing of the cross members 58 of a particular vehicle.

Figure 7:
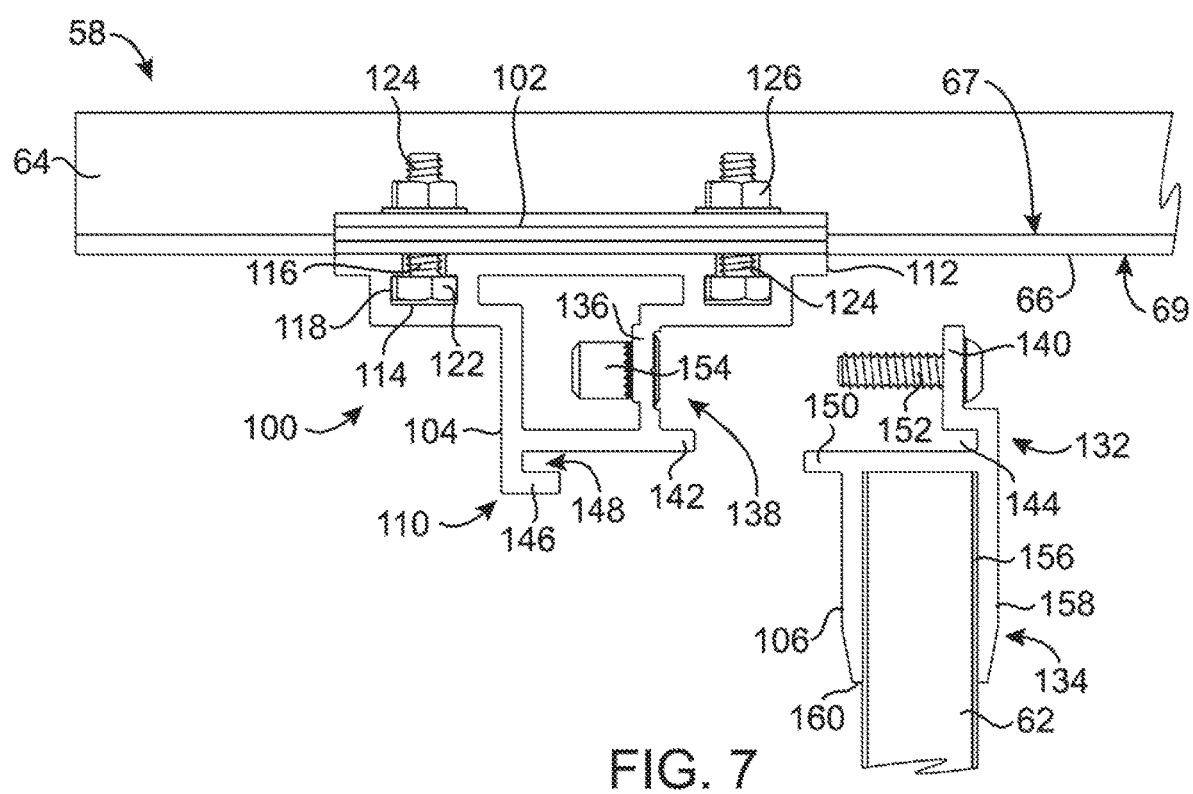
FIG. 7 is a partially exploded front view of the mounting system of FIG. 3.

The clamping portion 108 of the mounting rail 104 may include a mounting platform 112 with at least one mounting slot 114 formed into the mounting platform. As shown in FIG. 4, the mounting platform 112 may be substantially flat and span substantially the entire length of the mounting rail 104 from a first end 103 to a second end 105. In some embodiments, the mounting slots 114 may be formed along substantially the entire length of the mounting rail 104, but it is contemplated that, in some embodiments, mounting slots may run only partially along the length of the mounting rail between the first and second ends 103, 105. Additionally, although two mounting slots 114 are illustrated in FIG. 4, it is contemplated that any suitable number of mounting slots may be formed in the mounting platform 112. As shown in FIGS. 6 and 7, the mounting slots 114 may have a slot opening portion 116 and a slot groove portion 118. In some embodiments, such as illustrated in FIGS. 6 and 7, the slot opening portion 116 may be relatively narrower than the slot groove portion 118; i.e., have a smaller width. The slot groove portion 118 may be formed so as to accommodate a head portion 122 of at least one clamping fastener 120, such as a bolt, and the slot opening portion 116 may be formed so as to accommodate a body portion 124 of the clamping fastener 120. In some embodiments, the body portion of the clamping fastener 120 may be threaded, but it is contemplated that non-threaded fasteners may be used as well.

In some embodiments, the head portion 122 of at least one clamping fastener 120 may be slidably disposed within the slot groove portion 118 such that the clamping fastener may slide in the mounting slot 114 along the length of the mounting rail 104. The body portion 124 of the clamping fastener 120 may extend through the slot opening portion 116 and outward from the mounting platform 112 away from the mounting rail 104. In some embodiments, the slot groove portion 118 may be sized so as to slidably accommodate the head portion 122 of the clamping fastener 120, but not allow the head portion to substantially rotate within the slot groove portion. In such embodiments, the clamping fastener 120 may be substantially locked from rotating relative to the mounting rail 104.

Referring to FIGS. 6 and 7, the clamping body 102 may be removably coupled to the mounting platform 112 using at least one clamping fastener 120. In some embodiments, one or more clamping fastener holes may be formed through the clamping body 102 to accommodate the body portion 124 of the clamping fastener 120. In such embodiments, a clamping nut 126 may engage with the body portion 124 of the clamping fastener 120 to tighten and secure the clamping body 102 toward the mounting platform 112 of the mounting rail 104. In some embodiments, the lower flange 66 of a cross member 58 may be disposed between the clamping body 102 and the mounting platform 112, substantially holding the mounting rail 104 against the cross member. The lower flange 66 of the cross member 58 may have an upper surface 67 and a lower surface 69. In some embodiments, the mounting platform 112 may engage the lower surface 69 of the lower flange 66, and the clamping body 102 may engage the upper surface 67 of the lower flange, so as to clamp the lower flange between the clamping body and the mounting surface. The mounting rail 104 may be removed from the cross member 58 by unfastening the clamping fastener 120 holding the clamping body 102 in place against the lower flange 66. In some embodiments, unfastening the clamping fastener 120 may include loosening the clamping nut 126 and removing it from the body portion 124 of the clamping fastener 120.

Figure 8:
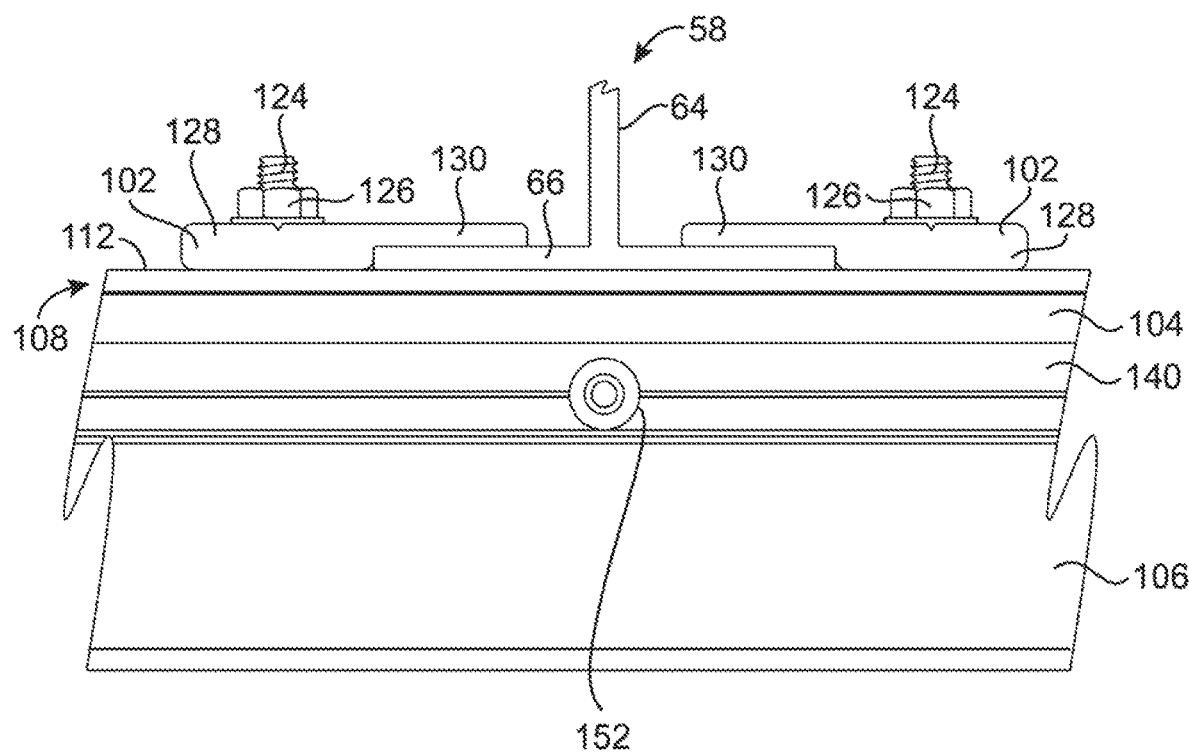
FIG. 8 is a right side view of the mounting system of FIG. 3.

In some embodiments, as shown in FIG. 8, the clamping body 102 may have a fastener portion 128 and a clamping portion 130. In some embodiments, the fastener portion 128 may have a greater thickness than the clamping portion 130. The body portion 124 of the clamping fastener 120 may pass through the clamping portion 130 and may hold the clamping body 102 substantially flush against the mounting platform 112. When tightened against the mounting platform 112, the clamping portion 130 of the clamping body 102 may be shaped so as to form a gap between the clamping portion of the clamping body and the mounting platform 112. In such embodiments, the lower flange 66 may be disposed between the clamping portion 130 of the clamping body 102 and the mounting platform 112 of the mounting rail 104. In such embodiments, the fastener portion 128 of the clamping body 102 may be substantially flush against the mounting platform 112 while the clamping portion 130 of the clamping body may be substantially flush against the upper surface 67 of the lower flange 66 of the cross member 58, and the mounting platform may be substantially flush against the lower surface 69 of the cross member.

Thus, the mounting system 100 may include as many clamping bodies 102 as is appropriate to secure the mounting rail 104 to the vehicle's 50 cross members 58. Depending on the spacing of the vehicle's cross members 58, the clamping bodies 102 may be movable to positions in which they may engage the cross members. Additionally, although the embodiments illustrated herein show the mounting system 100 being coupled to vehicle cross members, it should be contemplated that the clamping bodies 102 may be used to connect to other suitable portions of a vehicle.

Referring again to FIGS. 5-7, the mounting system 100 may include a panel bracket 106 including a mounting portion 132 and a panel portion 134 opposite the mounting portion. The mounting portion 132 of the panel bracket 106 may be removably or permanently coupled to the panel portion 110 of the mounting rail 104, and the panel portion 134 of the panel bracket 106 may be removably or permanently coupled to a guard panel 62.

In some embodiments, the panel portion 110 of the mounting rail may include features that may engage with complimentary features of the mounting portion 132 of the panel bracket 106. For example, as shown in FIG. 7, the panel portion 110 of the mounting rail 104 may include a bracket receiver portion 13 that may define a first bracket receiving recess 138 within which a bracket flange 140 of the panel bracket 106 may be received. The bracket receiver portion 136 may include a first mounting rail protrusion 142 that may engage with a first protrusion recess 144 defined by the bracket flange 140 of the panel bracket 106. The panel portion 110 of the mounting rail 104 may also include second mounting rail protrusion 146 that may define a second bracket receiving recess 148. In some embodiments, the second bracket receiving recess 148 may receive a bracket protrusion 150 of the panel bracket 110. The second mounting rail protrusion 146 may be engaged against the bracket protrusion 150 when the bracket protrusion is engaged within the second bracket receiving recess 148. Thus, in some embodiments, such as shown in FIG. 6, when the mounting portion 132 of the panel bracket 106 is coupled to the panel portion 110 of the mounting rail 104, the bracket flange 140 may be engaged against the bracket receiver portion 136 in the first bracket receiving recess 138, the first mounting rail protrusion 142 may be engaged within the first protrusion recess of the panel bracket 106, and the bracket protrusion 150 may be engaged against the second mounting rail protrusion 146 within the second bracket receiving recess 148.

In some embodiments, at least one bracket fastener 152 may removably or permanently couple the panel bracket 106 to the mounting rail 104. For example, bracket fasteners 152 may pass through the bracket flange 140 of the panel bracket 106 and into the bracket receiver portion 136 of the mounting rail 104. In some embodiments, the bracket receiver portion 136 may include a threaded fastener orifice 154 that may receive a threaded bracket fastener 152 so that the bracket fastener may hold the bracket flange 140 in the first bracket receiving recess 138 against the bracket receiver portion 136. It is contemplated, however, that the bracket fastener 152 may be secured using a nut or any other suitable mechanism. Further, it is contemplated that any suitable number of fasteners may be used to couple the panel bracket 106 to the mounting rail 104. The number of bracket fasteners 152 used may depend on the length of the mounting system 100, the weight of the guard panel 62, etc. Additionally, it is contemplated that, in some embodiments, the bracket flange 140 may be substantially permanently affixed to the mounting rail 104 via welding, brazing, adhesive, or any other suitable adhesion or connecting process. In yet other embodiments, the panel bracket 106 may be integral with the mounting rail 104.

The panel portion 134 of the panel bracket 106 may be coupled to one or more guard panels 62. In some embodiments, the guard panel 62 may be received into a panel recess 156 defined by a pair of panel bracket arms 158, 160. In some embodiments, the guard panel 62 may be adhered to the panel bracket 106, such as via the panel bracket arms 158, 160. In some embodiments, the guard panel 62 may be coupled to the panel bracket 106 using one or more mechanical fasteners, such as bolts, screws, rivets, nails, etc. In such embodiments the mechanical fasteners may pass through one or both of the panel bracket arms 158, 160 and through the guard panel itself. In some embodiments, the panel bracket 106 may have only one panel bracket arm to which the guard panel may be coupled. In other embodiments, the panel bracket 106 may include more than two panel bracket arms that may define more than one panel recess 156. In such embodiments, more than one guard panel 62 may be coupled to the panel bracket 106 and the mounting rail 104. It is also contemplated that, in some embodiments, the panel bracket 106 or the guard panel 62 may be pivotally coupled to the mounting rail 104 so as to allow the guard panel to be selectively pivoted between a vertical and horizontal orientation. Such embodiments may help provide relatively easy access to the space under a vehicle for repairs or other activities when desired, but still provide underride protection.

Figure 9:
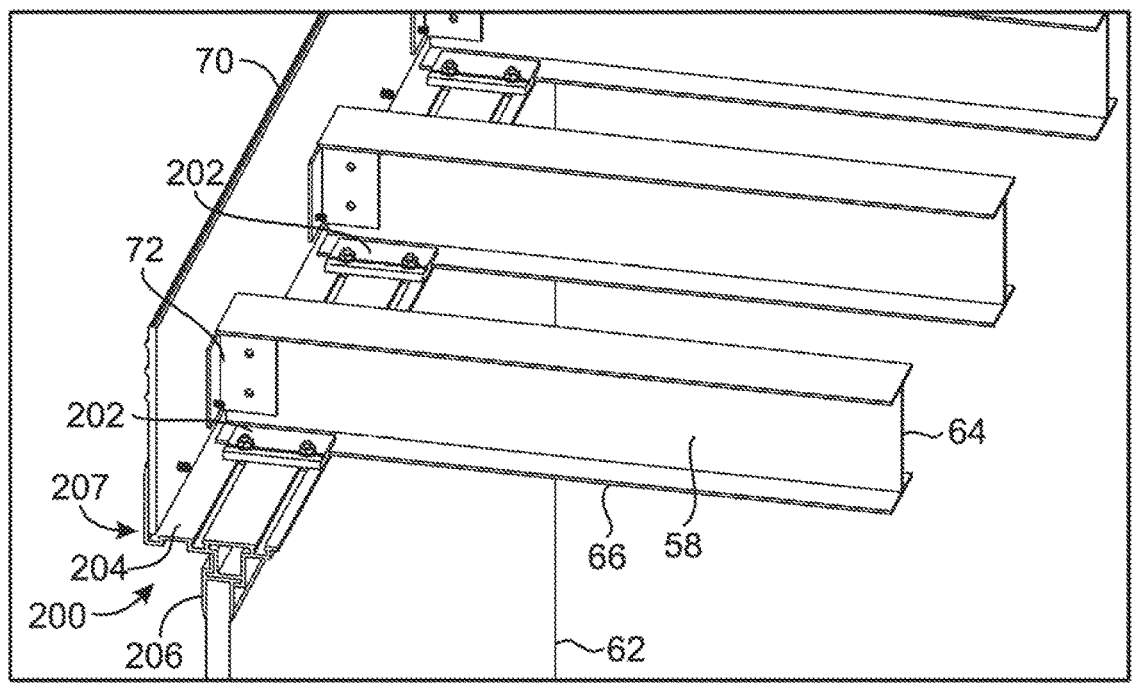
FIG. 9 is a front perspective view of another embodiment of a mounting system as described herein connected to cross members of a truck or other vehicle.
Figure 10:
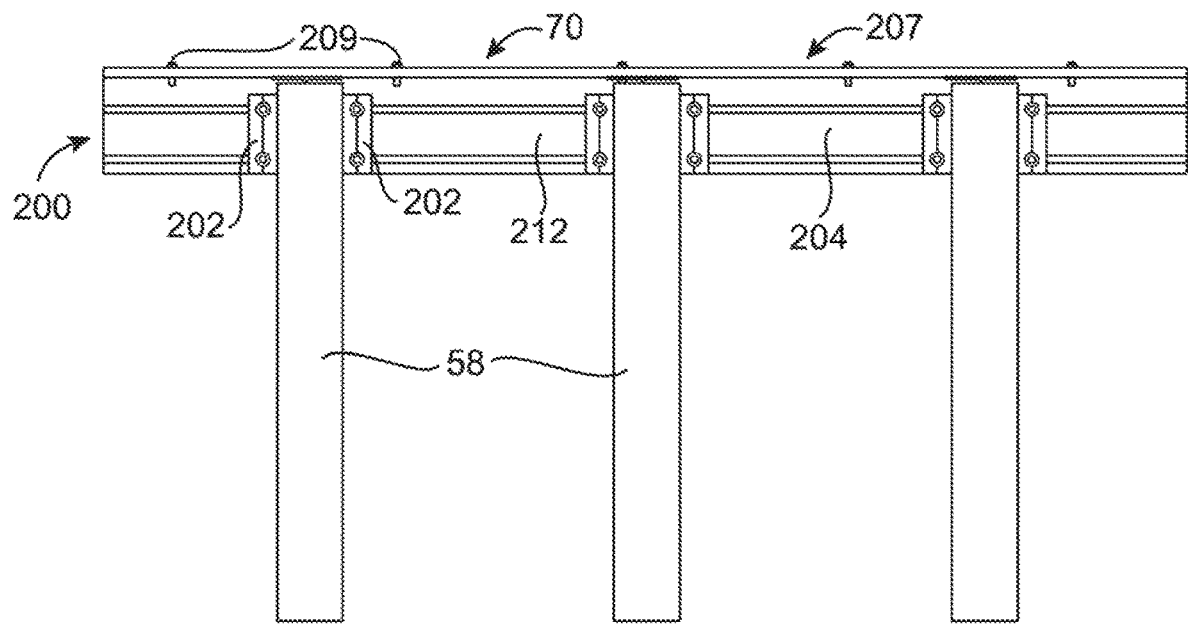
FIG. 10 is a top view of the mounting system of FIG. 9.

FIGS. 9-12 illustrate another embodiment of a mounting system 200 that may include an additional or alternative attachment mechanism. In some vehicles 50, the cross members 58 may be coupled to a side wall 70 of the vehicle on one or both sides. One example of a side wall 70 is shown in FIG. 1. As shown in FIG. 9, the cross members 58 may be connected to the side wall 70 via a cross member bracket 72. In some embodiments, the mounting system 200 may be coupled to a side wall 70 of the vehicle 50 in addition to or instead of being coupled to the cross members 58.

Much like the mounting system 100 described above, the mounting system 200 may include at least one clamping body 202, a mounting rail 204, and a panel bracket 206. The mounting rail 204 may have a clamping portion 208 and a panel portion 210 opposite the clamping portion. In some embodiments, the clamping bodies 202 may be removably and/or movably coupled to the clamping portion 208, and the panel bracket 206 may be coupled removably or permanently to the panel portion 210. As described in greater detail above regarding the mounting system 100, in some embodiments, at least one clamping body 202 may engage the lower flange 66 of at least one cross member 58 against the clamping portion 208 of the mounting rail 204 to couple the mounting system 200 to the cross members. Additionally, the panel bracket 206 may be coupled to a guard panel 62.

Figure 11:
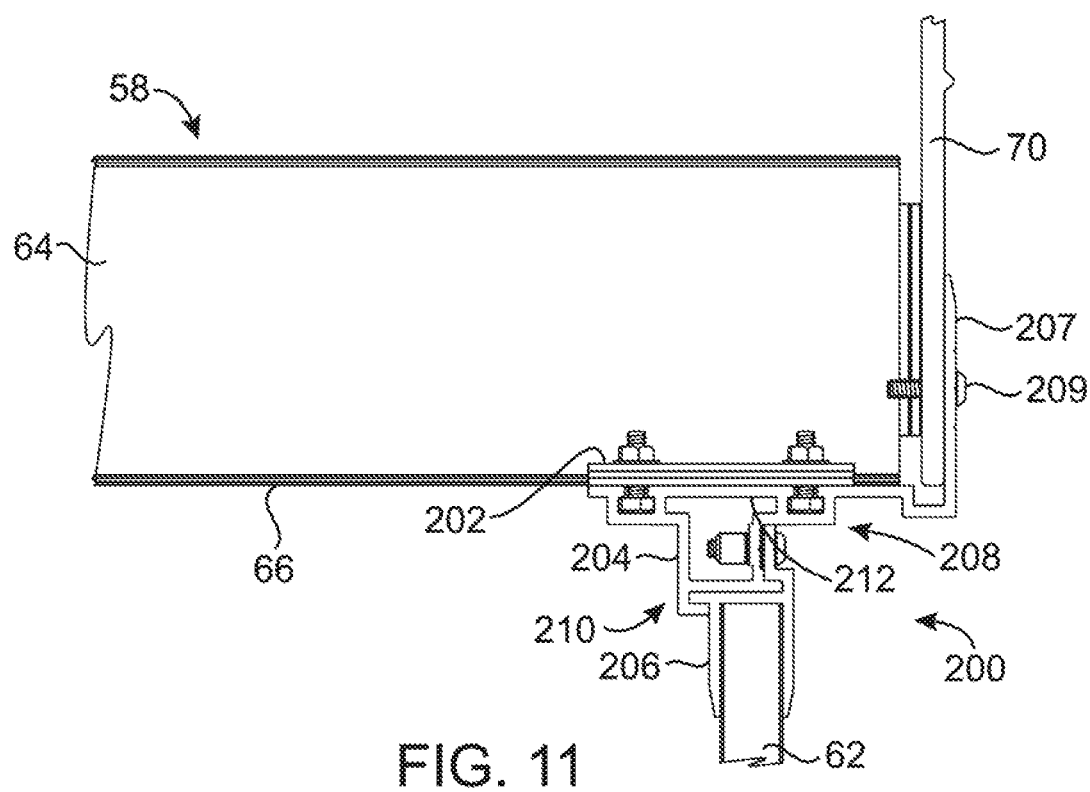
FIG. 11 is rear view of the mounting system of FIG. 9.
Figure 12:
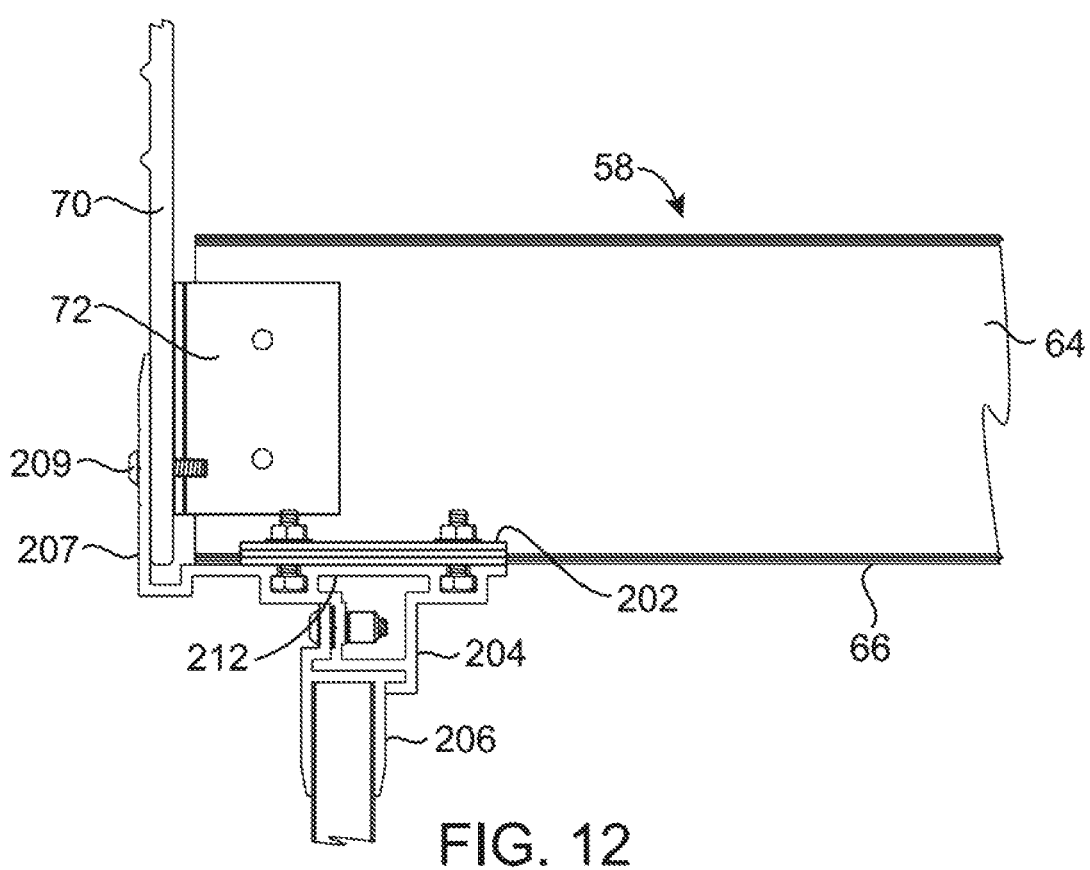
FIG. 12 is a front view of the mounting system of FIG. 9.

The clamping portion 208 of the mounting rail 204 may also include a side wall bracket 207 extending from the clamping portion 208, and more specifically, extending from the mounting platform 212. The side wall bracket 207 may extend substantially perpendicular to the mounting platform 212. In some embodiments, when the mounting system 200 is coupled to the cross member 58, the side wall bracket 207 may extend adjacent to the side wall 70, as shown in FIGS. 11 and 12. The side wall bracket 207 may be coupled to the side wall 70 with one or more mechanical fasteners 209, such as bolts, screws, rivets, etc. In some embodiments, at least one of the mechanical fasteners 209 may also couple the side wall bracket 207 to at least one cross member bracket 72. In other embodiments, the side wall bracket 207 may be coupled to the side wall 70 with adhesives, by welding, by brazing, or any other suitable coupling method.

Figure 13:
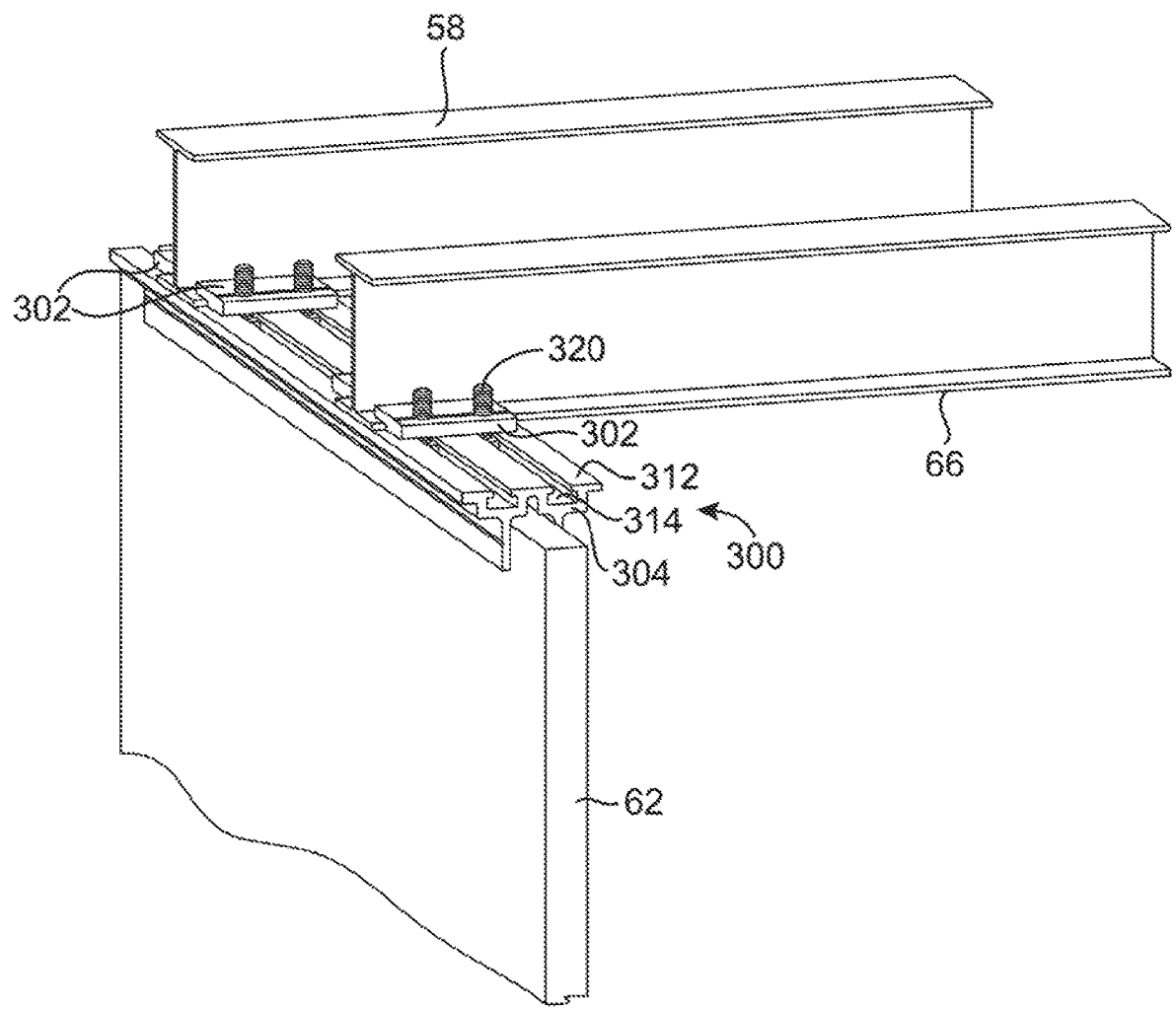
FIG. 13 is a front perspective view of another embodiment of a mounting system as described herein connected to cross members of a truck or other vehicle.
Figure 14:
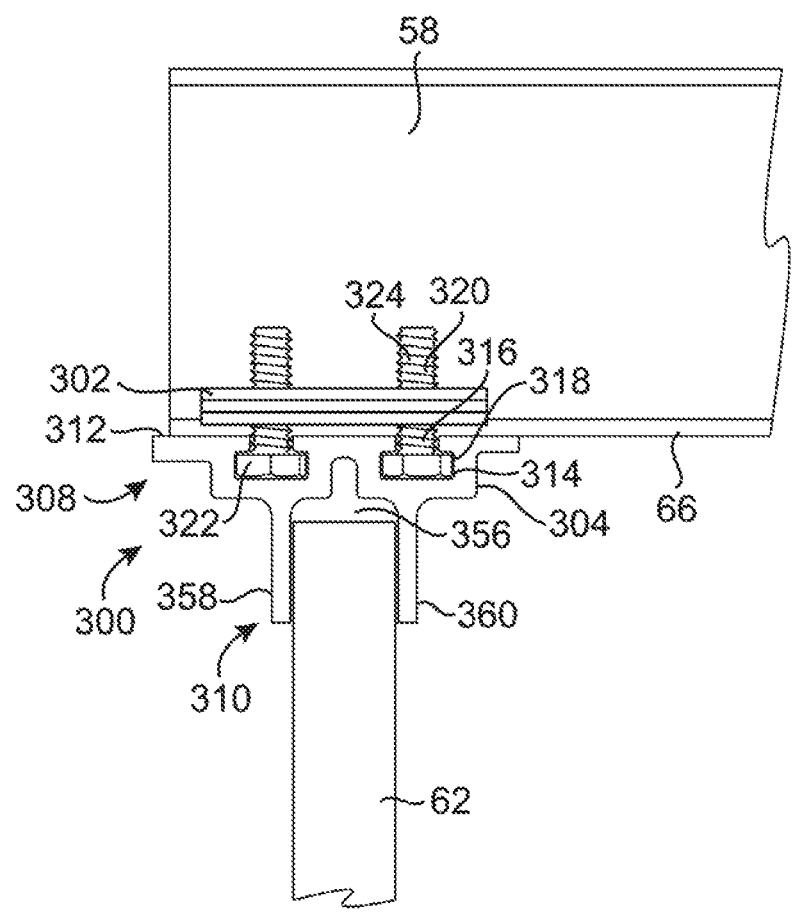
FIG. 14 is a front view of the mounting system of FIG. 13.

FIGS. 13 and 14 show another embodiment of a mounting system 300 that may include a clamping body 302 that is substantially similar to the clamping body 102 described herein with respect to the mounting system 100. The mounting system 300 may also include a mounting rail 304. In such embodiments, the mounting rail 304 may include a clamping portion 308 and a panel portion 310 opposite the clamping portion. The clamping portion 308 may be substantially similar to the clamping portion 108 described herein with respect to the mounting system 100. Each clamping body 302 may be removably and/or movably coupled to the clamping portion 308, and the panel portion 310 may include a panel bracket 306.

In some embodiments, the clamping bodies 302 may couple the mounting system 300 to the lower flange 66 of each cross member 58 without any holes or other modifications to the cross members 58 themselves, or to any other portion of a vehicle, such as the chassis or frame. In some embodiments, a plurality of clamping bodies 302 may be movably distributed across the mounting rail 104 to accommodate variable cross-member spacing. The clamping bodies 302 may be movable with respect to the mounting rail 304 to match the spacing of the cross members 58 of a particular vehicle.

The clamping portion 308 of the mounting rail 304 may include a mounting platform 312 with at least one mounting slot 314 formed into the mounting platform. As shown in FIG. 13, the mounting platform 312 may be substantially flat and span substantially the entire length of the mounting rail 304. In some embodiments, the mounting slots 314 may be formed along substantially the entire length of the mounting rail 304, but it is contemplated that, in some embodiments, mounting slots may not run the entire length of the mounting rail. Additionally, although two mounting slots 314 are illustrated in FIGS. 13 and 14, it is contemplated that any suitable number of mounting slots may be formed in the mounting platform 312. The mounting slots 314 may have a slot opening portion 316 and a slot groove portion 318. In some embodiments, the slot opening portion 316 may be relatively narrower than the slot groove portion 318. The slot groove portion 318 may be formed so as to accommodate a head portion 322 of at least one clamping fastener 320, such as a bolt, and the slot opening portion 316 may be formed so as to accommodate a body portion 324 of the clamping fastener 320. In some embodiments, the body portion 324 of the clamping fastener 320 may be threaded, but it is contemplated that non-threaded fasteners may be used as well.

In some embodiments, the head portion 322 of at least one clamping fastener 320 may be slidably disposed within the slot groove portion 318 such that the clamping fastener may slide in the mounting slot 314 along the length of the mounting rail 304. The body portion 324 of the clamping fastener 320 may extend through the slot opening portion 316 and outward from the mounting platform 312 away from the mounting rail 304. In some embodiments, the slot groove portion 318 may be sized so as to slidably accommodate the head portion 322 of the clamping fastener 320, but not allow the head portion to substantially rotate within the slot groove portion. In such embodiments, the clamping fastener 320 may be substantially locked from rotating relative to the mounting rail 304.

In some embodiments, the clamping body 302 may be removably coupled to the mounting platform 312 using at least one clamping fastener 320. In some embodiments, one or more clamping fastener holes may be formed through the clamping body 302 to accommodate the body portion 324 of the clamping fastener 320. In such embodiments, a clamping nut (similar to clamping nut 126 in FIGS. 6 and 7) may engage with the body portion 324 of the clamping fastener 320 to tighten and secure the clamping body 302 toward the mounting platform 312 of the mounting rail 304. In some embodiments, the lower flange 66 of a cross member 58 may be disposed between the clamping body 302 and the mounting platform 312, substantially holding the mounting rail 304 against the cross member. The mounting rail 304 may be removed from the cross member 58 by unfastening the clamping fastener 320 holding the clamping body 302 in place against the lower flange 66. In some embodiments, unfastening the clamping fastener 320 may include loosening the clamping nut 326 and removing it from the body portion 324 of the clamping fastener 320.

The mounting system 300 may include as many clamping bodies 302 as is appropriate to secure the mounting rail 304 to the vehicle's 50 cross members 58. Depending on the spacing of the vehicle's cross members 58, the clamping bodies 302 may be movable to positions in which they may engage the cross members. Additionally, although the embodiments illustrated herein show the mounting system 300 being coupled to vehicle cross members, it should be contemplated that the clamping bodies 302 may be used to connect to other suitable portions of a vehicle.

The panel portion 310 of the mounting rail 304 may include a panel bracket 306, which may be removably or permanently coupled to one or more guard panels 62. In some embodiments, the guard panel 62 may be received into a panel recess 356 defined by a pair of panel bracket arms 358, 360. In some embodiments, the guard panel 62 may be adhered to the panel bracket 306, such as via the panel bracket arms 358, 360. In some embodiments, the guard panel 62 may be coupled to the panel bracket 306 using one or more mechanical fasteners, such as bolts, screws, rivets, nails, etc. In such embodiments the mechanical fasteners may pass through one or both of the panel bracket arms 358, 360 and through the guard panel itself. In some embodiments, the panel bracket 306 may have only one panel bracket arm to which the guard panel may be coupled. In other embodiments, the panel bracket 306 may include more than two panel bracket arms that may define more than one panel recess 356. In such embodiments, more than one guard panel 62 may be coupled to the panel bracket 306 and the mounting rail 304. It is also contemplated that, in some embodiments, the panel bracket 306 or the guard panel 62 may be pivotally coupled to the mounting rail 304 so as to allow the guard panel to be selectively pivoted between a vertical and horizontal orientation. Such embodiments may help provide relatively easy access to the space under a vehicle for repairs or other activities when desired, but still provide underride protection.

Figure 15:
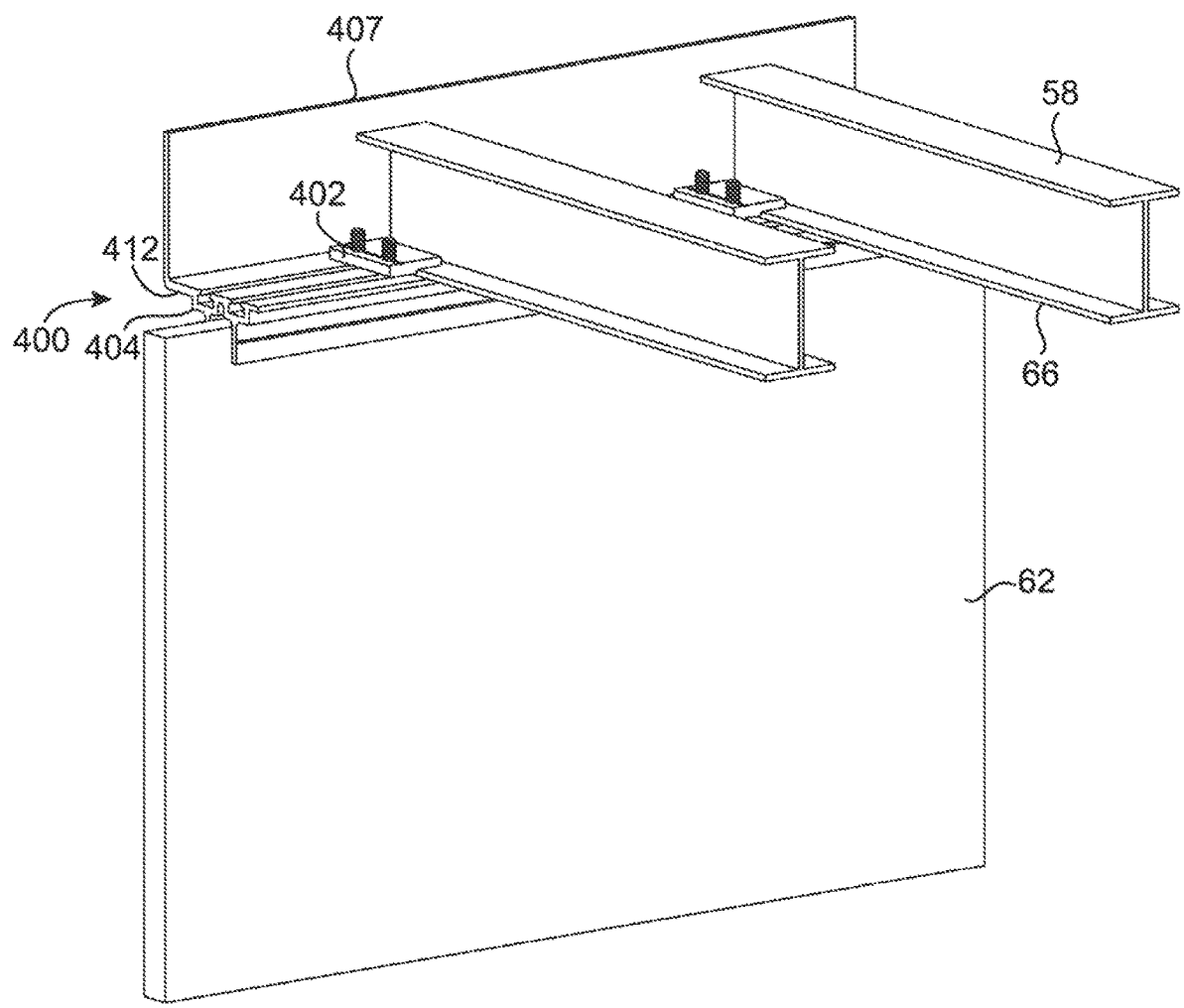
FIG. 15 is a front perspective view of another embodiment of a mounting system as described herein connected to cross members of a truck or other vehicle.
Figure 16:
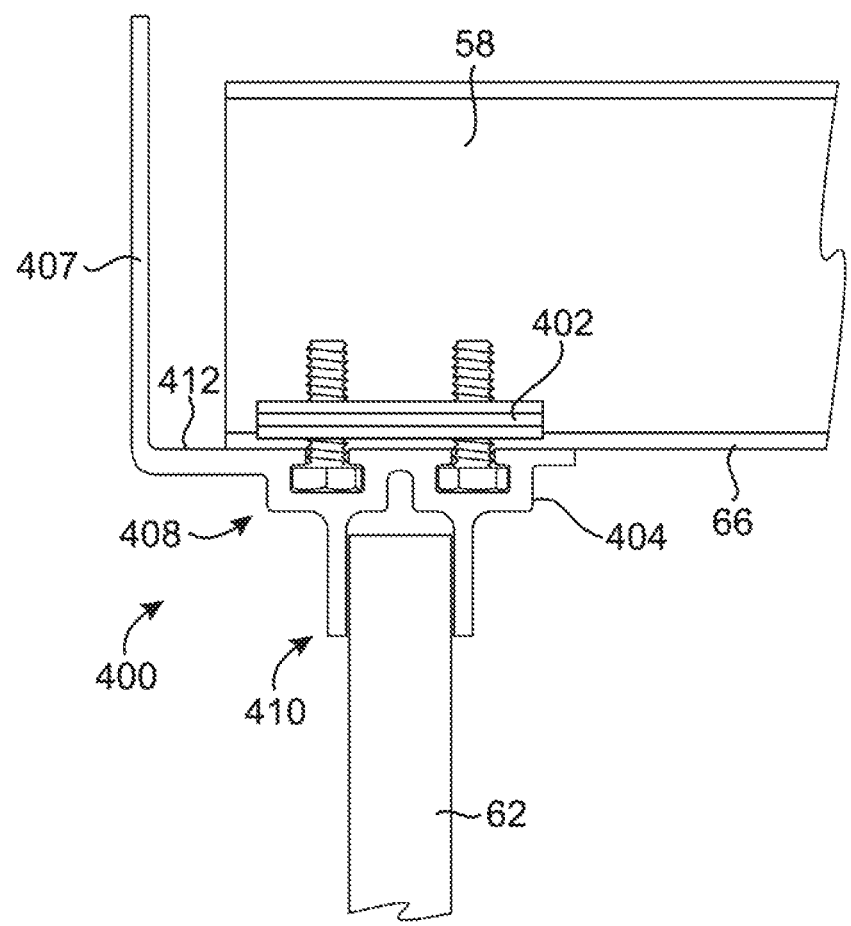
FIG. 16 is a front view of the mounting system of FIG. 15.

FIGS. 15 and 16 illustrate another embodiment of a mounting system 400 that may include an additional or alternative attachment mechanism. As described above with respect to the mounting system 200, in some vehicles 50, the cross members 58 may be coupled to a side wall 70 of the vehicle on one or both sides. One example of a side wall 70 is shown in FIG. 1. The cross members 58 may be connected to the side wall 70 via a cross member bracket 72. In some embodiments, the mounting system 400 may be coupled to a side wall 70 of the vehicle 50 in addition to or instead of being coupled to the cross members 58.

Much like the mounting system 300 described above, the mounting system 400 may include a clamping body 402 that is substantially similar to the clamping body 102 described herein with respect to the mounting system 100. The mounting system 400 may also include a mounting rail 404. In such embodiments, the mounting rail 404 may include a clamping portion 408 and a panel portion 410 opposite the clamping portion. In some embodiments, the clamping bodies 402 may be removably and/or movably coupled to the clamping portion 408. As described in greater detail above regarding the mounting system 300, in some embodiments, at least one clamping body 402 may engage the lower flange 66 of at least one cross member 58 against the clamping portion 408 of the mounting rail 404 to couple the mounting system 400 to the cross members. The panel portion 410 of the mounting rail 404 may include a panel bracket 406, which may be removably or permanently coupled to one or more guard panels 62 in a manner substantially similar to that described herein with respect to the mounting system 300.

The clamping portion 408 of the mounting rail 404 may also include a side wall bracket 407 extending from the clamping portion 408, and more specifically, extending from the mounting platform 412. The side wall bracket 407 may extend substantially perpendicular to the mounting platform 412. In some embodiments, when the mounting system 400 is coupled to the cross member 58, the side wall bracket 407 may extend adjacent to the side wall 70 (similar to that shown with respect to side wall bracket 207 in FIGS. 11 and 12). The side wall bracket 407 may be coupled to the side wall 70 with one or more mechanical fasteners, such as bolts, screws, rivets, etc. In some embodiments, at least one of the mechanical fasteners may also couple the side wall bracket 407 to at least one cross member bracket. In other embodiments, the side wall bracket 407 may be coupled to the side wall 70 with adhesives, by welding, by brazing, or any other suitable coupling method.

The foregoing description and drawings merely explain and illustrate the invention and the invention is not limited thereto. While the specification is described in relation to certain implementation or embodiments, many details are set forth for the purpose of illustration. Thus, the foregoing merely illustrates the principles of the invention. For example, the invention may have other specific forms without departing from its spirit or essential characteristic. The described arrangements are illustrative and not restrictive. To those skilled in the art, the invention is susceptible to additional implementations or embodiments and certain of these details described in this application may be varied considerably without departing from the basic principles of the invention. It will thus be appreciated that those skilled in the art will be able to devise various arrangements which, although not explicitly described or shown herein, embody the principles of the invention and, thus, within its scope and spirit.

What is claimed is:

1. A mounting system for a guard panel on a vehicle with one or more cross members the mounting system comprising:

a mounting rail having a first end and a second end, the mounting rail including:
  a clamping portion including a mounting platform, at least one mounting slot being formed in the mounting platform at least partially along a length of the mounting rail between the first end and the second end, and
  a panel portion opposite the clamping portion;
a panel bracket coupled to the panel portion of the mounting rail, the panel bracket configured to receive at least one guard panel; and
at least one clamping body removably coupled to the mounting platform of the mounting rail, the at least one clamping body being movable along the at least one mounting slot of the mounting platform;
wherein at least a portion of each of the at least one clamping body is configured to engage a first surface of a cross member and at least a portion of the mounting platform is configured to engage a second surface of the cross member opposite the first surface, so as to clamp at least a portion of the cross member between the at least one clamping body and the mounting platform.

2. The mounting system of claim 1 further comprising at least one clamping fastener coupling each of the at least one clamping body to the mounting platform wherein at least a portion of the at least one clamping fastener is slidably disposed within the at least one mounting slot so as to permit the at least one clamping fastener to slide along a length of the mounting slot.

3. The mounting system of claim 2, wherein the at least one clamping fastener includes a head portion and a body portion, and wherein the head portion is slidably disposed within the at least one mounting slot and the body portion extends through a portion of each of the at least one clamping body.

4. The mounting system of claim 3 further comprising a clamping nut engaged with the body portions of each of the at least one clamping fasteners on an opposing side of the at least one clamping body as the head portion of the clamping fastener so as to secure the clamping body against the mounting platform.

5. The mounting system of claim 1, wherein the at least one clamping body further comprises a fastener portion and a clamping portion, the fastener portion being engaged against the mounting platform and the clamping portion being configured to engage the second surface of one of the one or more cross members.

6. The mounting system of claim 5 further comprising at least one clamping fastener including a head portion and a body portion, the head portion being slidably disposed within the mounting slot and the body portion extending through the fastener portion of the at least one clamping body so as to couple the at least one clamping body to the mounting platform.

7. The mounting system of claim 1, wherein the at least one mounting slot is formed through the entire length of the mounting rail between the first end and the second end.

8. The mounting system of claim 1, wherein the panel bracket is coupled to the panel portion of the mounting rail via at least one bracket fastener.

9. The mounting system of claim 1, wherein the mounting rail further comprises a side wall bracket extending away from and substantially perpendicular to the mounting platform in a direction away from the panel portion of the mounting rail.

10. A mounting rail for a mounting system to mount a guard panel to a vehicle with cross members, the mounting rail comprising:
  a clamping portion including a mounting platform, at least one mounting slot being formed in the mounting platform at least partially along a length of the mounting rail between a first end and a second end, each of the at least one mounting slot including:
    a slot opening portion formed into the mounting platform and configured to slidably receive a body portion of a clamping fastener, and
    a slot groove portion formed deeper into the mounting platform than the slot opening portion, the slot groove portion being configured to slidably receive a head portion of the clamping fastener; and
  a panel portion opposite the clamping portion, the panel portion being coupled to a guard panel;
  wherein the clamping fastener is configured to selectively secure a clamping body against the mounting platform so as to couple the clamping portion to a cross member of the vehicle.

11. The mounting rail of claim 10, wherein the slot groove portion of the at least one mounting slot has a greater width than the slot opening portion.

12. The mounting rail of claim 10, wherein the at least one mounting slot extends to at least one of the first end or the second end of the mounting rail.

13. The mounting rail of claim 10, wherein the at least one mounting slot is formed through the entire length of the mounting platform between the first end and the second end.

14. The mounting rail of claim 10, wherein the mounting rail further comprises a side wall bracket extending away from and substantially perpendicular to the mounting platform in a direction away from the panel portion of the mounting rail.

15. The mounting rail of claim 10, wherein the panel portion includes a panel bracket that receives the guard panel.

16. The mounting rail of claim 10, wherein the panel portion is configured to be coupled to a panel bracket via a bracket fastener.

17. The mounting rail of claim 10 wherein the slot groove portion is configured to allow the head portion of the clamping fastener to slide along a length of the slot groove portion but to prevent rotation of the clamping fastener with respect to the mounting rail.

18. A mounting system for a guard panel on a vehicle with one or more cross members, the mounting system comprising:
  a mounting rail having a first end and a second end, the mounting rail including:
    a clamping portion including a mounting platform, at least one mounting slot being formed in the mounting platform at least partially along a length of the mounting rail between the first end and the second end, and
    a panel portion opposite the clamping portion, the panel portion configured to removably receive at least one guard panel;
  at least one clamping body removably coupled to the mounting platform of the mounting rail, the at least one clamping body being movable along the at least one mounting slot of the mounting platform; and
  at least one clamping fastener coupling each of the at least one clamping body to the mounting platform, wherein at least a portion of the at least one clamping fastener is slidably disposed within the at least one mounting slot so as to permit the at least one clamping fastener to slide along a length of the mounting slot;

wherein at least a portion of each of the at least one clamping body is configured to engage a first surface of a cross member and at least a portion of the mounting platform is configured to engage a second surface of the cross member opposite the first surface, so as to clamp at least a portion of the cross member between the at least one clamping body and the mounting platform.

19. The mounting system of claim 18, wherein the at least one mounting slot is formed through the entire length of the mounting rail between the first end and the second end.

20. The mounting system of claim 18, wherein the at least one mounting slot includes:
- a slot opening portion formed into the mounting platform and configured to slidably receive a body portion of the at least one clamping fastener, and
- a slot groove portion formed deeper into the mounting platform than the slot opening portion, the slot groove portion being configured to slidably receive a head portion of the at least one clamping fastener.

* * * * *